(12) United States Patent
Stoller et al.

(10) Patent No.: US 7,217,366 B2
(45) Date of Patent: May 15, 2007

(54) PURIFICATION OF AMMONIUM METALLATE SOLUTIONS

(75) Inventors: Viktor Stoller, Bad Harzburg (DE); Juliane Meese-Marktscheffel, Goslar (DE); Armin Olbrich, Seesen (DE); Michael Erb, Salzgitter (DE); Gerhard Gille, Goslar (DE)

(73) Assignee: H. C. Starck GmbH & Co. KG (DE)

( * ) Notice: Subject to any disclaimer, the term of this patent is extended or adjusted under 35 U.S.C. 154(b) by 428 days.

(21) Appl. No.: 10/935,563

(22) Filed: Sep. 7, 2004

(65) Prior Publication Data

US 2005/0072735 A1    Apr. 7, 2005

(30) Foreign Application Priority Data

Sep. 10, 2003  (DE) ................. 103 41 727

(51) Int. Cl.
*B01D 61/00* (2006.01)
*B01D 63/00* (2006.01)
*C01G 37/00* (2006.01)
*B01J 33/00* (2006.01)

(52) U.S. Cl. ............... 210/651; 210/660; 210/661; 210/681; 210/195.2; 423/49; 423/53; 423/54; 423/55; 423/56; 502/321

(58) Field of Classification Search ........ 210/650–654, 210/660–661, 195.2, 681, 669, 259, 263; 423/49, 53–56, 87, 182, 600, 593.1; 502/255, 502/321, 514, 515
See application file for complete search history.

(56) References Cited

U.S. PATENT DOCUMENTS

| | | | |
|---|---|---|---|
| 3,393,971 A | 7/1968 | Vanderpool et al. ......... 23/22 |
| 3,848,048 A | 11/1974 | Ronzio et al. ................ 423/54 |
| 4,207,296 A | 6/1980 | Nauta et al. .................. 423/61 |
| 4,525,331 A | 6/1985 | Cheresnowsky et al. ...... 423/54 |
| 4,596,701 A | 6/1986 | Cheresnowsky et al. ...... 423/54 |
| 4,601,890 A | 7/1986 | Cheresnowsky ............ 423/54 |
| 4,604,226 A | 8/1986 | Cheresnowsky et al. ...... 423/54 |
| 4,612,172 A | 9/1986 | Brunelli et al. ............... 423/56 |
| 4,643,884 A | 2/1987 | Cheresnowsky et al. ...... 423/53 |
| 4,933,152 A | 6/1990 | Scheftic et al. ............... 423/56 |
| 5,676,817 A * | 10/1997 | Gutknecht et al. .......... 205/477 |
| 5,891,407 A * | 4/1999 | Gutknecht et al. ........... 423/49 |
| 6,113,868 A * | 9/2000 | Mathy et al. ................. 423/54 |
| 6,117,327 A * | 9/2000 | Ciora et al. ................. 210/637 |
| 2005/0072735 A1* | 4/2005 | Stoller et al. ............... 210/651 |

* cited by examiner

*Primary Examiner*—Ana Fortuna
(74) *Attorney, Agent, or Firm*—Connolly Bove Lodge & Hutz LLP

(57) ABSTRACT

A process for reducing the content of alkali metal impurities (e.g., potassium) in ammonium metallate solutions is described. The process involves subjecting a feed solution containing ammonium metallate and alkali metal impurities to membrane filtration. The membrane filtration results in the formation of a retentate having a reduced level alkali metal relative to the feed solution, and a permeate containing substantially the balance of alkali metal. The permeate may also be further treated, to remove alkali metal there from, by passage through a cation exchange column, thereby forming a cation exchange treated permeate that may be combined with the retentate of the membrane filtration step.

12 Claims, 4 Drawing Sheets

PURIFICATION OF AMMONIUM METALLATE SOLUTIONS

CROSS REFERENCE TO RELATED PATENT APPLICATION

The present patent application claims the right of priority under 35 U.S.C. §119 (a)–(d) of German Patent Application No. 10,341,727.3, filed Sep. 10, 2003.

FIELD OF THE INVENTION

The invention relates to a process for the preparation of highly pure ammonium metallate solutions, in particular highly pure ammonium molybdate solutions, by treatment of industrial ammonium metallate solutions by means of membrane filtration.

BACKGROUND OF THE INVENTION

Ammonium metallates can as a rule be readily crystallized and can be converted into metal oxides by thermal treatment. These can be reduced to the corresponding metals. In particular, ammonium metallates of molybdenum, for example ammonium molybdate, ammonium dimolybdate and ammonium polymolybdate, but also other oxo anion-forming metals, such as, for example, tungsten, rhenium, vanadium, niobium or tantalum, are therefore valuable compounds for obtaining corresponding metal oxides or metals. For a number of applications, it is decisive that the metals or metal compounds used have as low a content of impurities as possible. The recovery of pure molybdenum or pure molybdenum compounds is effected as a rule starting from molybdenite concentrates by oxidation, usually roasting of the sulphide in air, to give industrial molybdenum trioxide. This contains a whole range of impurities which, depending on origin and time of extraction of the corresponding molybdenite ore, may vary greatly in type and concentration. For the various uses of molybdenum, for example as an alloy component in steels, for wire production, as a catalyst component or as a pigment, the purity of the molybdenum metal or of the molybdenum compound has to meet very different requirements. A number of different processes for the working-up and purification of molybdenum or the compounds thereof, which utilize, for example, the principles of precipitation/crystallization, extraction or ion exchange, have therefore been developed. Impurities, in particular alkali metals, can be particularly effectively removed by sublimation of the roasted materials. However, this method is very complicated and is not practicable economically on an industrial scale.

Of course, not all impurities behave in the same way, both concerning the tolerable amounts in the product and concerning the separability. In particular, the element potassium can be separated from the molybdenum only with considerable effort. The potassium content must as a rule be <50–100 ppm in order to produce molybdenum powders which are suitable for the production of wires, rods, foils, sintered parts and especially alloys. The use of molybdenum in the area of catalysts or pigments also often requires chemically pure, in particular low-potassium molybdenum salts.

U.S. Pat. No. 4,612,172 describes a process for removing potassium from $MoO_3$ by leaching with a mixture of mineral acid and ammonium salt of the mineral acid, the mixture being said to be used in a three-fold excess relative to the molybdenum oxide. This process is also utilized in EP 191 148 A2, leaching being effected repeatedly here in order to reduce the potassium content to a value of about 50 ppm. According to U.S. Pat. No. 4,596,701, U.S. Pat. No. 4,525,331, U.S. Pat. No. 4,604,266 and U.S. Pat. No. 4,601,890, the purification of $MoO_3$ by leaching with a mixture of mineral acid and the ammonium salt of a mineral acid can be optimized if, after the leaching, the molybdenum trioxide is reacted with ammonium hydroxide to give ammonium molybdate, the ammonium molybdate solution is brought into contact with a cation exchanger and finally the ammonium molybdate thus purified is crystallized and calcined. The process differs substantially in the choice of the acid/ammonium salt mixture. Said processes are comparatively complicated, multistage processes which require the use of large amounts of leaching agent and have the further disadvantage that molybdenum fractions which go into solution together with the impurities during the leaching are not recovered.

In order to avoid the loss of molybdenum through the leaching, U.S. Pat. No. 4,933,152 proposes a process in which a first leaching with nitric acid/ammonium nitrate and a second leaching with nitric acid are effected, the mother liquors being recycled. In this way, the process can be carried out continuously and the molybdenum fractions remain in the system. Nevertheless, this process too is associated with the major disadvantage that technically complicated leaching/filtration reactions have to be carried out repeatedly and large amounts of nitric acid-containing solutions have to be handled and circulated.

According to U.S. Pat. No. 3,848,049, impurities can be removed from a roasted molybdenum oxide concentrate also by leaching with water, the leaching optionally being carried out in the presence of a cation exchange resin. The residue is converted by addition of ammonium hydroxide into ammonium molybdate, which is then crystallized and can be further processed. The content of potassium in the product is stated as 150 ppm in example 2 and is thus still above the value which can be tolerated for many applications. In order to increase the separability of potassium, U.S. Pat. No. 3,393,971 proposes a particular thermal treatment of the molybdenum oxide. According to U.S. Pat. No. 4,207,296, too, the solubility of potassium in hot water is said to be increased by subjecting the molybdenum oxide to a thermal treatment. Heating is effected to at least 525° C. and cooling is then effected at a rate of at least 30° C. per minute to a temperature of less than 400° C. Corresponding thermal treatments are complicated in terms of apparatus and instrumentation and as a rule do not lead to reproducible residual contents of potassium. Such a procedure might be of technical interest only for those processors of molybdenum ores which carry out roasting of molybdenite themselves. For the further purification of industrial molybdenum oxide and other molybdenum compounds, such a procedure is unattractive, inter alia owing to the high energy consumption.

Another concept for removing impurities, in particular potassium, from molybdenum and compounds thereof is solvent extraction. Here, sodium molybdate is first transferred into an organic phase by acid extraction, the impurities remaining in the refined product. The molybdate is then removed again from the organic phase in the form of ammonium molybdate by stripping with ammonia. It is thus possible to obtain very pure ammonium molybdate solutions, but the process is very complicated and expensive. In particular, the fact that large amounts of organic solvent have to be used is disadvantageous.

SUMMARY OF THE INVENTION

It was therefore an object of the present invention to provide a simple and economical process which makes it possible to remove alkali metal impurities, in particular potassium, from ammonium metallate solutions, it not being necessary to work with large amounts of acidic leaching agents or organic solvent.

This object can be achieved in a very simple manner by subjecting the ammonium metallate solution to be treated to a membrane filtration.

The invention therefore relates to a process for reducing the content of alkali metal impurities in ammonium metallate solutions, the ammonium metallate solution being subjected to a membrane filtration.

More particularly, in accordance with the present invention, there is provided a process for reducing the content of alkali metal impurities in ammonium metallate solutions comprising:

(a) providing a membrane having a retentate side and a permeate side;
(b) contacting a feed solution comprising ammonium metallate and alkali metal impurities with the retentate side of said membrane;
(c) withdrawing a permeate from the permeate side of said membrane; and
(d) withdrawing a retentate from the retentate side of said membrane, wherein said retentate comprises an amount of alkali metal impurities that is reduced relative to said feed solution, and said permeate comprises an amount of alkali metal impurities that is substantially equivalent to the difference between the amount of alkali metal impurities present in said feed solution and said amount of alkali metal impurities present in said permeate. While some ammonium metallate may pass through the membrane into the permeate, at least a majority of the ammonium metallate of the feed solution is retained on the retentate side of the membrane and accordingly retained in the retentate.

In further accordance with the present invention, there is provided a process as described above and further comprising:

(I) providing the apparatus of FIG. 1 (as described in further detail herein);
(II) introducing said feed solution into said storage container (5);
(III) forwarding said feed solution from said storage container (5) to said pump reservoir (3) by means of said high-pressure pump (6);
(IV) forwarding said feed solution from said pump reservoir (3) to said filtration cell (1) by means of said circulation pump (2);
(V) withdrawing said retentate from said retentate side of said membrane and forwarding said retentate back to said pump reservoir (3) by means of at least one conduit;
(VI) withdrawing said permeate from said permeate side of said membrane, and forwarding said permeate to said stirred container (11) by means of said free outflow conduit (10);
(VII) forwarding said permeate from said stirred container (11) to said cation exchange column (13) by means of said pump (12);
(VIII) withdrawing a cation exchange treated permeate from said cation exchange column (13);
(IX) forwarding said cation exchange treated permeate to said storage container (5); and (X) repeating steps (II) through (IX) at least once, said feed solution of step-(II) being the cation exchange treated permeate of step (IX).

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions used in the specification and claims are understood as modified in all instances by the term "about."

BRIEF DESCRIPTION OF THE DRAWINGS

In FIGS. 1–4, like reference numerals designate the same components and structural features.

DETAILED DESCRIPTION OF THE INVENTION

Figure 1:
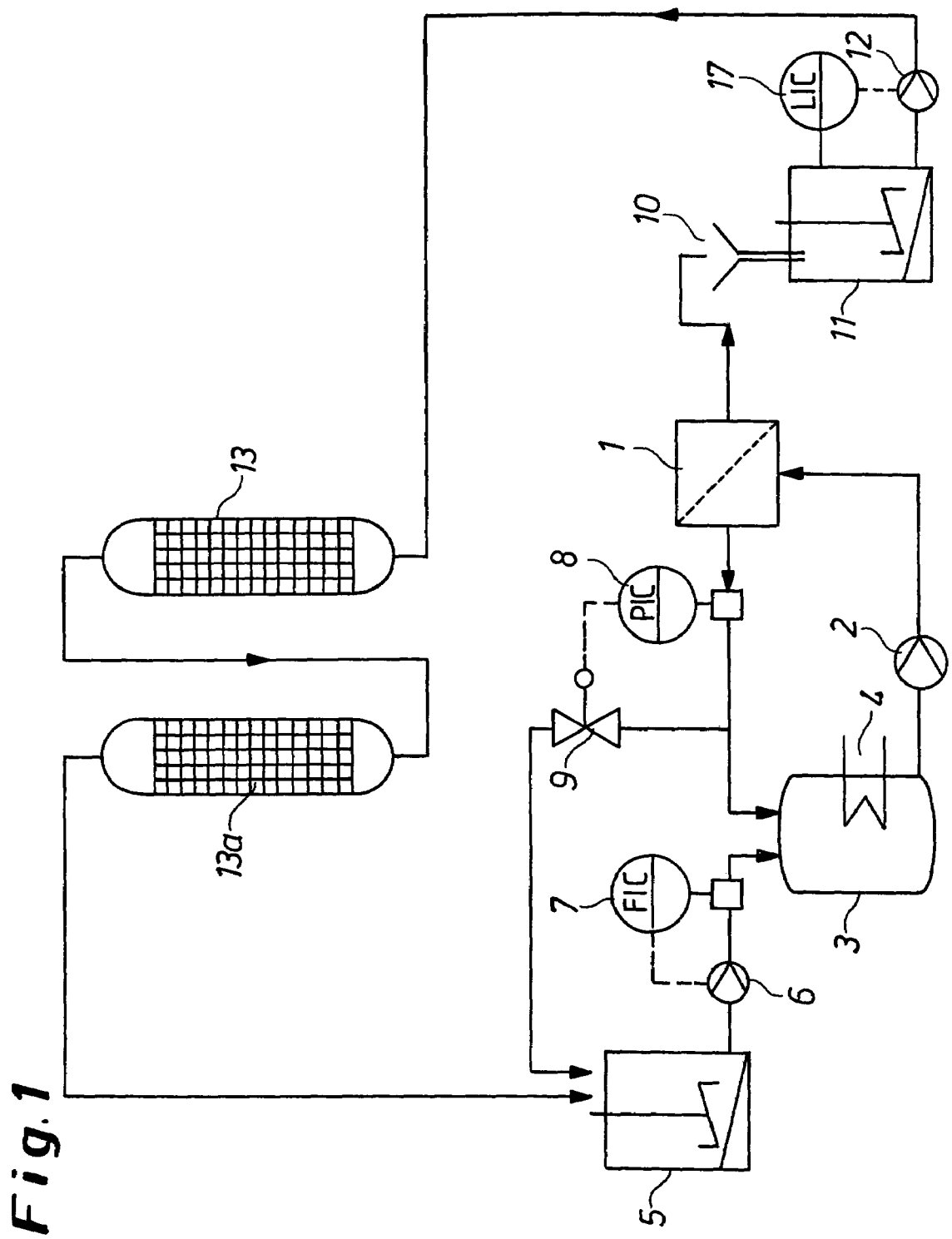
FIG. 1 is a schematic representation of an apparatus that may be used in an embodiment of the process of the present invention, in which a single filtration membrane stage (1) is used.

It has been found that it is not possible to separate potassium in a sufficient amount from metallate solutions having a high ammonium content by means of ion exchangers. However, this is possible if the metallate solution is first subjected, according to the invention, to a membrane filtration. The main amount of alkali metal impurity diffuses through the membrane while the major part of the metallate is retained. As a result of the now more advantageous, i.e. smaller, ratio of ammonium to potassium in the permeate of the membrane filtration, potassium can be selectively retained on a suitable cation exchanger. The process according to the invention permits the effective removal of alkali metal impurities from ammonium metallate solutions, a logarithmic relationship existing between depletion and wash volume, and a depletion factor of 10 being achieved after passage only 2.3 times through membrane filtration and ion exchange, in the case of that combination of membrane filtration and ion exchange which is preferred according to the invention, the outflow of the ion exchange column which contains the purified permeate being combined again with the retentate of the membrane filtration in order to pass again through the membrane filtration unit.

The process according to the invention is suitable for the purification of a large number of ammonium metallate solutions. The ammonium metallates of molybdenum, for example ammonium molybdate, ammonium dimolybdate and ammonium polymolybdate, but also other metallate-forming metals, such as, for example, tungsten, rhenium, vanadium, niobium or tantalum, may be mentioned by way of example. As a rule, ammonium metallate solutions are present in the form of aqueous, alkaline or neutral solutions and have a content of potassium of 200–5000 ppm, based on the metal.

Solutions which contain ammonium molybdate, ammonium dimolybdate and/or ammonium polymolybdate are preferably treated.

By means of the process according to the invention, substantially all alkali metal impurities can be effectively separated off. The alkali metal impurities are present in the ammonium metallate solutions in dissolved form, the alkali metals of course being present in the form of their cations. The process according to the invention is preferably used whenever it is necessary to remove potassium reliably.

According to the invention, the ammonium metallate solution to be purified is subjected to a membrane filtration. Conventional membrane filtration apparatuses may be used, the membrane used being chosen so that it has a high permeability for alkali metals but as low a permeability as possible for metallate species. For example, polymer- or ceramic-based semipermeable membranes, for example perfluorinated polypropylene membranes, which are sold by DuPont under the name Nafion®, can be used. The type NFM 1121 is preferably used, particularly preferably type NFM 1120. The ammonium metallate species is enriched in the retentate and the alkali metal impurity is enriched in the permeate.

The content of alkali metal impurities in the retentate is already substantially reduced so that, depending on the desired use, said retentate can be used directly for obtaining ammonium metallate. This is effected in a known manner, for example by crystallization, which can be effected, for example, by evaporating down the solution or changing the pH in a controlled manner. Alternatively, the retentate can also be directly converted thermally into the metal oxide.

However, since the permeate forming in the membrane filtration also still contains valuable metallate fractions, the permeate is preferably treated with a cation exchanger for removing alkali metal impurities enriched therein and, after the treatment with the cation exchanger, the permeate is combined with the retentate of the membrane filtration.

For further reduction of the fraction of alkali metal impurities, the retentate recombined with the purified permeate is preferably subjected again to the membrane filtration, the permeate forming is purified again and the permeate thus purified is combined with the retentate which has now formed, so that a continuous circulation results. This procedure can be repeated until the amount of alkali metal impurities in the ammonium metallate solution has fallen below a specified value, i.e. until the desired degree of depletion has been achieved.

This procedure with recycling of the permeate into the retentate has the advantage that the membrane filtration takes place under virtually constant osmotic conditions and hence in a very uniform and controlled manner, it being possible for the reaction in a closed circulation moreover to be monitored in a particularly simple manner in terms of instrumentation.

The purified ammonium metallate solution can then, optionally after further purification operations have been carried out, be fed for further processing, i.e. as a rule for concentration and crystallization.

Cation exchangers which may be used are all cation exchangers with which alkali metal cations can be removed from aqueous systems. Suitable cation exchangers are, for example, strongly acidic exchange resins or zeolites. For separating potassium from ammonium metallate solutions, in particular from ammonium molybdate solutions, Lewatit® MonoPlus TM S 100H, Lewatit® S110H from Bayer or Amberlit® IR-120 from Merck is preferably used.

Depending on the type of metallate-forming metal, it may be advantageous to add monovalent anions, such as, for example, chloride or nitrate, to the ammonium metallate solution to be treated. As a rule, this is done by adding the corresponding ammonium salts or acids. Depending on the anion concentration in the permeate, it may be necessary to separate off ammonia fractions present by distillation, the alkali metal impurities remaining as salts in the bottom. The distilled aqueous ammonia solution can be recycled to the ammonium metallate solution to be treated.

Depending on the retentivity of the membrane used in the membrane filtration for the ammonium metallate species to be purified, it may be advantageous if the membrane filtration is carried out in two stages, the two membrane filtration stages being connected as countercurrent cascades, and the permeate of the first membrane filtration being fed to a second membrane filtration, the second permeate forming thereby being treated with a cation exchanger, and the second permeate thus purified being combined with the retentate of the first membrane filtration. Of course, the membrane filtration can also be carried out in three or more stages.

Purified ammonium metallate solutions which, based on the metal, have less than 1000 ppm of potassium, particularly preferably less than 100 ppm of potassium, are preferably prepared using the process according to the invention.

Figure 2:
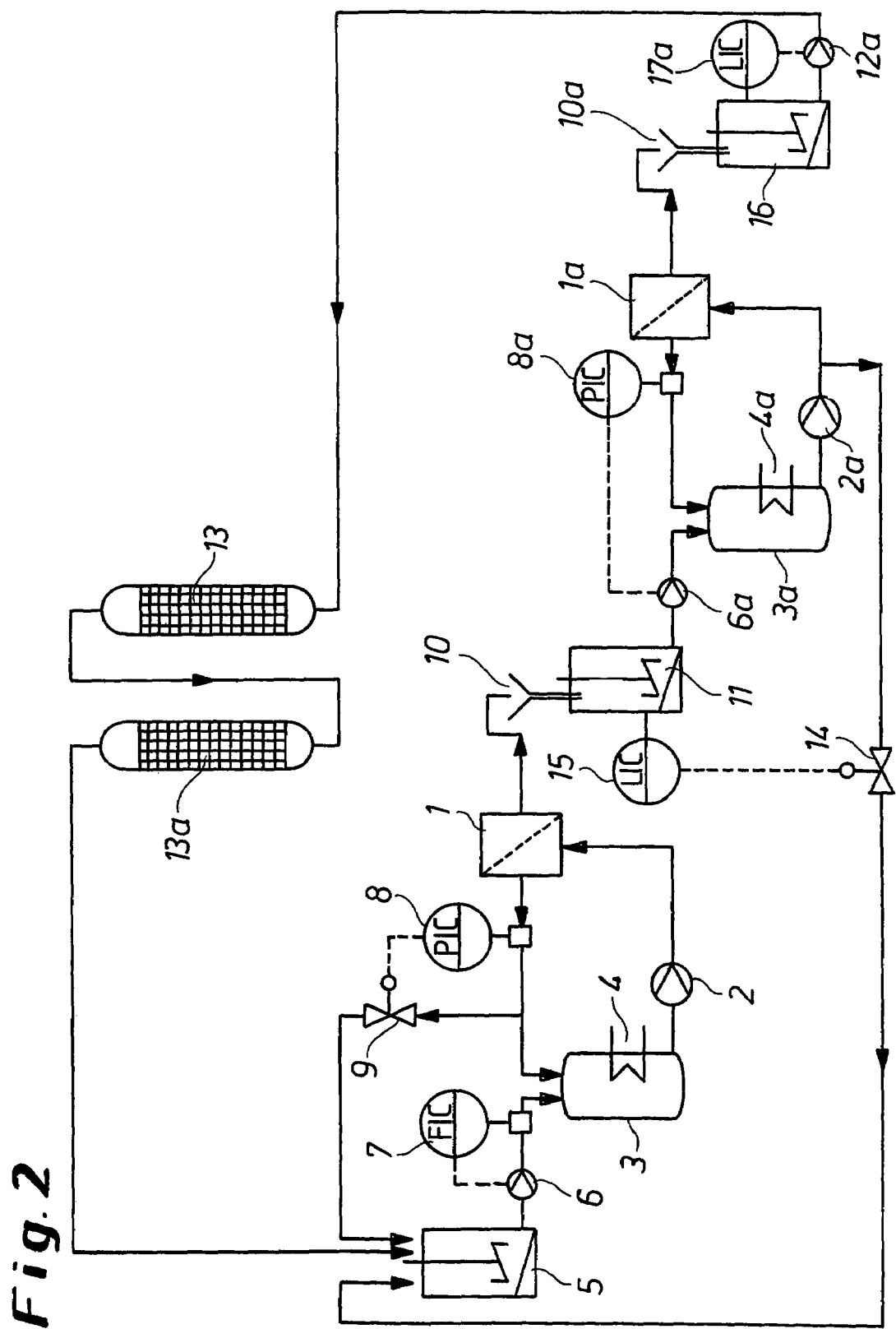
FIG. 2 is a schematic representation of an apparatus that may be used in an embodiment of the process of the present invention, in which two separate filtration membrane stages (1 and 1a) are arranged in series.
Figure 3:
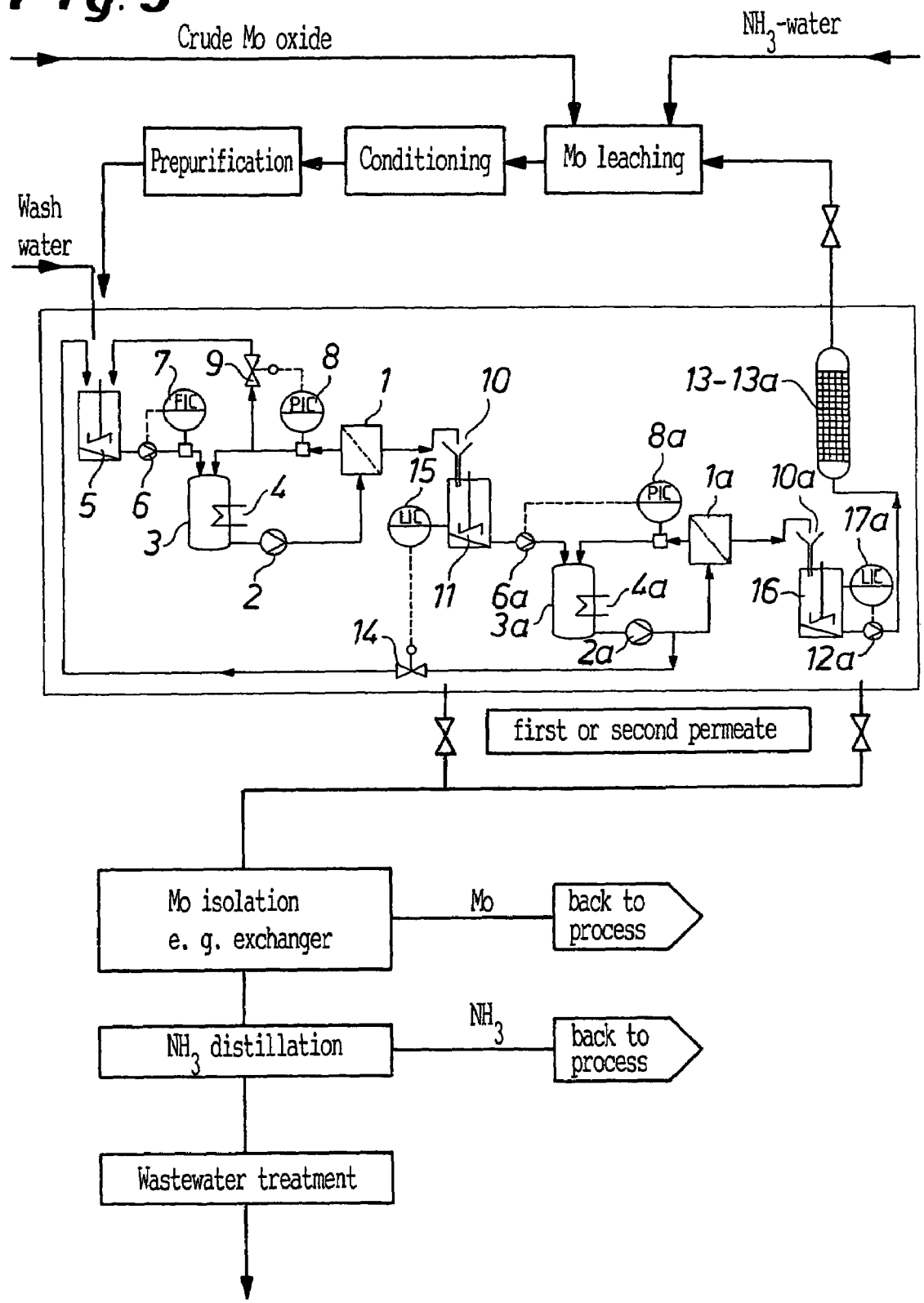
FIG. 3 is a schematic representation of an apparatus that may be used in an embodiment of the process of the present invention.

FIGS. 1, 2 and 3 each schematically show the sequence of particular embodiments of the process according to the invention.

The process according to the invention is further explained below by the description of these embodiments where this description is not to be understood as a restriction of the principle according to the invention, and it is clear to a person skilled in the art that there is a number of further possible embodiments.

FIG. 1 schematically shows an embodiment of the process according to the invention in which the ammonium metallate solution to be treated is freed from alkali metal impurities by means of a membrane filtration cell (1) and two cation exchange columns (13, 13a).

The ammonium metallate solution to be purified is transported by means of the circulation pump (2) through the membrane filtration cell (1). A pump reservoir (3) which is in the form of a pressure-resistant container and is equipped with a heat exchanger (4) which makes it possible to remove heat forming during operation and to maintain a constant temperature is present in the circulation. The ammonium metallate solution is fed to the circulation from a stirred storage container (5) by means of a high-pressure pump (6). The regulation is effected by means of a flow controller FIC (7). The ammonium metallate solution enters the pump reservoir (3) in the form of the pressure-resistant container, from which it is pumped by means of the circulation pump (2) into the membrane filtration cell (1) and is split there into retentate and permeate. The retentate flows via a control valve (9) back into the storage container (5), it being possible to establish the desired pressure by means of the pressure controller PIC (8). The permeate, which has substantially lower concentrations of metallate and ammonium but virtually the same concentration of potassium as the solution fed to the membrane filtration cell (1) via the high-pressure pump (6), passes via a free outflow (10) into the stirred container (11), from where it is fed via the pump (12) to the cation exchange columns (13) and (13a). The level in the container (11) is set by means of the level controller LIC (17). The two cation exchange columns (13) and (13a) are loaded with a cation exchange resin which takes up the alkali metal ions from the permeate. In the discharge of the columns, of which advantageously, but not necessarily, a plurality, in particular preferably two, are connected in series, the total permeate runs back into the storage container (5), thus completing the circulation. The original concentration of potassium in the ammonium metallate solution decreases substantially exponentially with the number of passes through the membrane filtration cell (1).

FIG. 2 schematically shows a further embodiment of the process according to the invention, the ammonium metallate solution to be treated being freed from alkali metal impurities by means of two membrane filtration cells (1, 1a) and two cation exchange columns (13, 13a). For units which are already used in the procedure according to FIG. 1, the reference numerals are retained.

For the instrumentation, FIG. 2 shows a process variant which requires only a flow controller FIC (7) in the first membrane filtration unit. However, other alternatives are of course also conceivable, for example control by means of two flow controllers.

The ammonium metallate solution to be purified is initially introduced into the storage container (5) and passes through the first membrane filtration unit just as described for the process variant according to FIG. 1. In contrast to the process variant according to FIG. 1, however, a membrane whose retentivity with respect to the metallate species to be purified is not as great as in the case of the simpler, first variant is now used in the membrane filtration cell (1), so that significant concentrations of metallate and, associated therewith, also of ammonium ions occur in the first permeate, the ammonium ions complicating or even preventing the desired separation of the alkali metal ions in a downstream cation exchange column (13, 13a). The membrane used may be, for example, the perfluorinated membrane of the type Nafion NFM 1121.

The problem is solved by feeding the first permeate from the container (11) via a second high-pressure pump (6a) to the second pump reservoir (3a) in the form of a pressure-resistant container and having a heat exchanger (4a) and via the circulation pump (2a) finally to a second membrane filtration cell (1a) whose membrane is such that it can discriminate sufficiently between the metallate and alkali metal ions and nevertheless permits sufficient permeate flows owing to the osmotic pressure in the first permeate now being substantially reduced compared with the starting solution. A suitable membrane is, for example, the perfluorinated membrane of the type Nafion NFM 1120.

The first permeate running into the container (11) must of course be completely further transported. The instrumentation is therefore modified compared with the first membrane filtration unit, the variant described here of course being only one of many possible variants and therefore not having a limiting character.

The high-pressure pump (6a) of the second membrane filtration unit, which is otherwise designed in the same way as the first membrane filtration unit, is operated under pressure control by the second pressure controller PIC (8a). A constant level in the container (11) is ensured by virtue of the fact that the controller LIC (15) acts on the valve (14) via which the retentate of the second membrane filtration unit is transported by the circulation pump (2a) back into the storage container (5). A countercurrent cascade therefore results.

The second permeate discharged via the second free outflow (10a) now has a quality comparable to that after carrying out the experiment according to FIG. 1, i.e. a sufficiently advantageous alkali metal-to-ammonium ratio, so that it can be fed from the second container (16) by means of the pump (12a), controlled by means of level controller LIC (17a) according to the process variant shown in FIG. 1, to the cation exchange columns (13) and (13a), whose discharge into the storage container (5) in turn completes the circulation.

FIG. 3 shows further embodiments of the process according to the invention, other possibilities for working-up of the permeates obtained being shown. For units which are already used in the procedure according to FIG. 1 or FIG. 2, the reference numerals are retained.

FIG. 1 and FIG. 2 show preferred process variants which, by connecting membrane filtration cells (1, 1a) and cation exchange columns (13, 13a), make it possible to operate in a circulation which is completely closed with respect to the metallate fractions. Depending on the circumstances during operation, however, this procedure can also be modified. Thus, for example, the discharge from the cation exchange columns (13) and (13a) can be initially taken, for example for leaching of industrial molybdenum trioxide, instead of being recycled into the storage container (5). Fresh wash water, in particular ammonia solution, can then be added to the storage container (5).

However, the permeates can also be fed, prior to separating off the alkali metal impurities by means of cation exchangers, to an isolation of the metallate, for example by treatment of the permeate with an anion exchanger. The resulting column discharge, which contains the alkali metal impurities, can be subjected to a wastewater treatment, optionally after distilling off the ammonia. The ammonia can optionally also be distilled off prior to the treatment of the permeate with an anion exchanger.

The procedure shown in FIG. 3, in which the metallate fractions are not transported in the closed circulation, is also possible in particular for continuous processing of crude liquors.

The following examples serve for further explanation of the invention, and the examples are intended to facilitate an understanding of the principle according to the invention and are not to be understood as a limitation thereof.

EXAMPLES

Example 1

According to the process variant as shown in FIG. 1, 7.4 $m^3$ of ammonium dimolybdate solution having an Mo content of 150 g/l were introduced into the storage container (5). The contents of alkali metal impurities in the solution were 750 mg/l of K and 600 mg/l of Na. The remaining system was loaded with dilute ammonium dimolybdate solution having an Mo content of about 2 g/l of Mo. By means of high-pressure pump (6), circulation pump (2), flow controller (7) and pressure controller (8), a permeate flow of 4.6 $m^3$/h was established. The membrane filtration cell (1) used had a membrane area of 130 $m^2$, a Nafion® membrane NFM 1120 being used as the membrane. The permeate emerging from the membrane filtration cell (1) flowed via the free outflow (10) into the container (11) and was passed by means of pump (12) via the cation exchange columns (13)

and (13a) in order to remove the alkali metal impurities from the permeate. The cation exchange columns (13) and (13a) were loaded with the cation exchanger Lewatit® S 100H. The purified permeate was transported back into the storage container (5).

Figure 4:
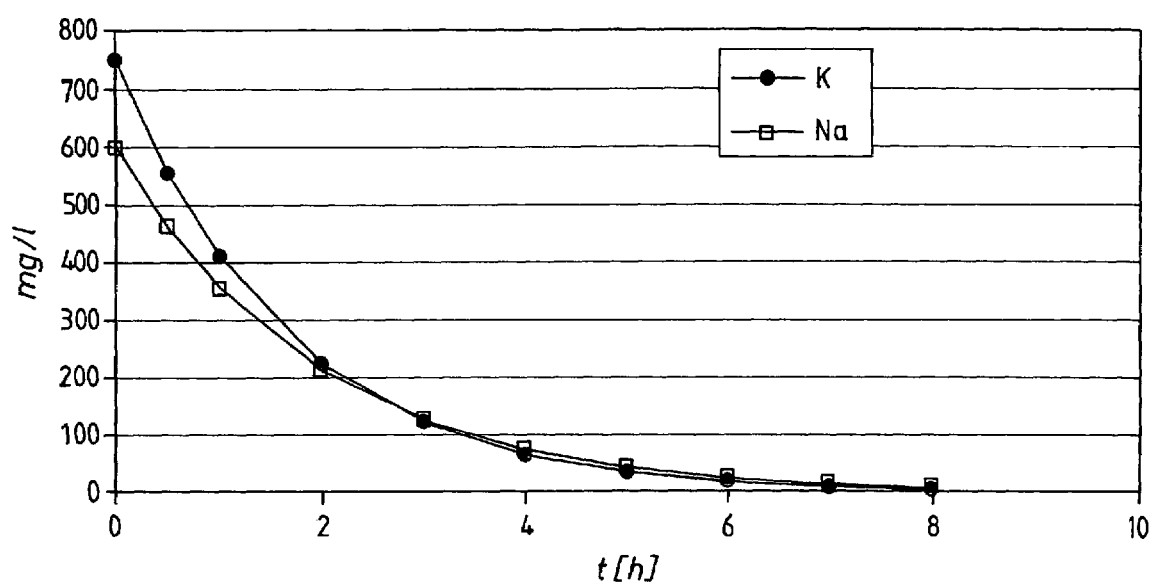
FIG. 4 is a graphical representation of a plot of the concentration of alkali metal in an ammonium dimolybdate feed solution as a function of time, as the feed solution is continuously recycled and treated by membrane filtration in accordance with the method of the present invention, and as further described in Example 1 herein.

The variation of the concentration of potassium and sodium as a function of time is shown in FIG. 4, the concentration of potassium or sodium in mg/l being plotted against the run time of the experiment in h. It is clearly evident that the alkali metal impurities were very effectively removed from the ammonium dimolybdate solution. After only 4 hours, i.e. after the circulation had passed through 2.5 times, the concentrations of sodium and potassium were each below 100 mg/l. After a further 2.5 passes, the residual content of sodium and potassium were each about 10 mg/l.

Example 2

The procedure was as in the process variant as shown in FIG. 2. The storage container (5) was loaded with 10 m³ of an ammonium molybdate solution having an Mo concentration of 100 g/l and alkali metal contents of 1000 mg/l of Na and 600 mg/l of K. From the preceding experiment, solutions having the following concentrations were still present in the remaining parts of the plant: the circulation of the first membrane filtration unit had an Mo concentration of 200 g/l, the Na concentration was 30 mg/l and the K content was 17 mg/l. The total volume in the circulation of the first membrane filtration unit was 0.5 m³. 5 m³ of an ammonium molybdate solution having an Mo content of 30 g/l and about the same alkali metal contents as the solution in the circulation of the first membrane filtration unit were present in the container (11). 0.5 m³ of an ammonium molybdate solution was likewise present in the circulation of the second membrane filtration unit. This solution had an Mo concentration of 60 g/l, the alkali metals once again having the same contents as the solution in the circulation of the first membrane filtration unit. The second container (16) was finally filled with 3 m³ of an ammonium molybdate solution having an Mo content of 2 g/l, the alkali metal concentrations once again being 30 mg/l of Na and 17 mg/l of K. The remainder of the system through the cation exchange columns (13) and (13a) to the storage container (5) was likewise filled with this ammonium molybdate solution, except that the solution was alkali-free after the cation exchange columns (13) and (13a). The membrane Nafion® NFM 1121 was used in the membrane filtration cell (1), and the membrane Nafion® NFM 1120 in the membrane filtration cell (1a). The cation exchange columns (13) and (13a) had been loaded with the cation exchanger Amberlit® IR-120.

The plant was started, 10 m³/h of the ammonium molybdate solution from the storage container (5) being fed to the first membrane filtration unit by means of the high-pressure pump (6) under flow control. The steady-state flows were 4 m³/h via control valve (9) into the storage container (5), 5.8 m³/h of permeate from the membrane filtration cell (1), 2.8 m³/h of retentate reflux via valve (14) into the storage container (5), and 3 m³/h of permeate from the second membrane filtration cell (1a). After the plant had been operated for 15 h, the alkali metal concentrations in the storage container (5) were determined as 33 mg/l for Na and 20 mg/l for K.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reducing the content of alkali metal impurities in ammonium metallate solutions comprising:
    (a) providing a membrane having a retentate side and a permeate side;
    (b) contacting a feed solution comprising ammonium metallate and alkali metal impurities with the retentate side of said membrane;
    (c) withdrawing a permeate from the permeate side of said membrane; and
    (d) withdrawing a retentate from the retentate side of said membrane,
wherein said retentate comprises an amount of alkali metal impurities that is reduced relative to said feed solution, and said permeate comprises an amount of alkali metal impurities that is substantially equivalent to the difference between the amount of alkali metal impurities present in said feed solution and said amount of alkali metal impurities present in said permeate.

2. The process of claim 1 further comprising:
    passing said permeate through a cation exchange column; and
    withdrawing a cation exchange treated permeate from said cation exchange column,
wherein said cation exchange treated permeate comprises an amount of alkali metal impurities that is less than the amount of alkali metal impurities present in said permeate.

3. The process of claim 2 further comprising combining said cation exchange treated permeate with said retentate, thereby forming a subsequent feed solution.

4. The process of claim 3 further comprising:
    (i) repeating steps (a) through (d) of claim 1, with said subsequent feed solution in place of said feed solution, said retentate being a retentate-(i) and said permeate being a permeate-(i);
    (ii) passing the permeate-(i) of step (i) through said cation exchange column, thereby forming a cation exchange treated permeate-(ii);
    (iii) combining said cation exchange treated permeate-(ii) of step (ii) with the retentate-(i) of step (i), thereby forming a feed solution-(iii); and
    (iv) repeating continuously steps (i) through (iii) with said feed solution-(iii) in place of said feed solution,
wherein steps (i) through (iii) are repeated continuously until said retentate-(i) comprises an amount of alkali metal impurities that is less than a specified amount.

5. The process of claim 2 wherein said cation exchanger comprises a material selected from the group consisting of exchange resins, liquid ion exchangers, zeolites and combinations thereof.

6. The process of claim 5 wherein the exchange resins are strongly acidic exchange resins.

7. The process of claim 1 wherein said alkali metal is potassium.

8. The process of claim 1 wherein the ammonium metallate is selected from the group consisting of ammonium molybdate, ammonium dimolybdate, ammonium polymolybdate and combinations thereof.

9. The process of claim 1 wherein said membrane is selected from the group consisting of polymer-based semipermeable membranes, ceramic-based semipermeable membranes and combinations thereof.

10. The process of claim 1 wherein said alkali metal is potassium, and said retentate comprises less than 1000 ppm of potassium, based on metal.

11. The process of claim 1 further comprising, (I) providing an apparatus comprising,
- a storage container (5),
- a high-pressure pump (6), which is in fluid communication with said storage container (5),
- a pump reservoir (3), which is in fluid communication with said high-pressure pump (6),
- a circulation pump (2), which is in fluid communication with said pump reservoir (3),
- a filtration cell (1) comprising said membrane, said filtration cell being in fluid communication with said circulation pump (2),
- a free outflow conduit (10), which is in fluid communication with said filtration cell (1),
- a stirred container (11), which is in fluid communication with said free outflow conduit (10),
- a pump (12), which is in fluid communication with said stirred container (11), and
- at least one cation exchange column (13), which is in fluid communication with said pump (12) and said storage container (5), (II) introducing said feed solution into said storage container (5), (III) forwarding said feed solution from said storage container (5) to said pump reservoir (3) by means of said high-pressure pump (6), (IV) forwarding said feed solution from said pump reservoir (3) to said filtration cell (1) by means of said circulation pump (2), (V) withdrawing said retentate from said retentate side of said membrane and forwarding said retentate back to said pump reservoir (3) by means of at least one conduit, (VI) withdrawing said permeate from said permeate side of said membrane, and forwarding said permeate to said stirred container (11) by means of said free outflow conduit (10), (VII) forwarding said permeate from said stirred container (11) to said cation exchange column (13) by means of said pump (12), (VIII) withdrawing a cation exchange treated permeate from said cation exchange column (13), (IX) forwarding said cation exchange treated permeate to said storage container (5), and (X) repeating steps (II) through (IX) at least once, said feed solution of step-(II) being the cation exchange treated permeate of step (IX).

12. The process of claim 1 further comprising, providing a first membrane filtration stage comprising said membrane, and providing a second membrane filtration stage comprising a second membrane having a retentate side and a permeate side, said first membrane stage and second membrane stage being in fluid communication with each other by means of a counter-cascade arrangement, contacting said permeate with the retentate side of said second membrane thereby forming a second permeate, passing said second permeate through a cation exchange column, thereby forming a cation exchange treated second permeate, and combining said cation exchange treated second permeate with said retentate of said membrane of said first membrane filtration stage.

* * * * *